(12) United States Patent
Wang et al.

(10) Patent No.: US 11,864,127 B2
(45) Date of Patent: Jan. 2, 2024

(54) METHODS AND APPARATUS TO FACILITATE AUTOMATIC ASSOCIATION OF PATHLOSS REFERENCE AND SPATIAL RELATIONS FOR FAST UPLINK BEAM SWITCHING

(71) Applicant: QUALCOMM Incorporated, San Diego, CA (US)

(72) Inventors: Xiao Feng Wang, San Diego, CA (US); Tao Luo, San Diego, CA (US); Yan Zhou, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 16/892,018

(22) Filed: Jun. 3, 2020

(65) Prior Publication Data
US 2020/0389852 A1     Dec. 10, 2020

Related U.S. Application Data

(60) Provisional application No. 62/857,252, filed on Jun. 4, 2019.

(51) Int. Cl.
*H04W 52/24* (2009.01)
*H04W 16/28* (2009.01)
(Continued)

(52) U.S. Cl.
CPC ........ *H04W 52/242* (2013.01); *H04B 7/0695* (2013.01); *H04L 5/0051* (2013.01);
(Continued)

(58) Field of Classification Search
CPC ... H04W 52/242; H04W 16/28; H04W 52/10; H04W 72/046; H04W 76/27;
(Continued)

(56) References Cited

U.S. PATENT DOCUMENTS

| 2019/0349867 | A1* | 11/2019 | MolavianJazi | H04W 52/146 |
| 2020/0052802 | A1* | 2/2020 | Ryu | H04W 24/08 |
| 2020/0205093 | A1* | 6/2020 | Kim | H04W 52/242 |

FOREIGN PATENT DOCUMENTS

EP     3481113 A1     5/2019

OTHER PUBLICATIONS

Ericsson: "Signalling Reduction for Beam-Based UL Power Control", 3GPP Draft, 3GPP TSG-RN WG1 Meeting #97, R1-1907475 Signalling Reduction for Beam-Based Power Control, 3rd Generation Partnership Project (3GPP), Mobile Competence Centre, 650, Route Des Lucioles, F-06921 Sophia-Antipolis Cedex, vol. RAN WG1, No. Reno, USA, May 13, 2019-May 17, 2019 May 13, 2019 (May 13, 2019), XP051728906, pp. 1-3, Retrieved from the Internet: URL: http://www.3gpp.org/ftp/Meetings%5F3GPP%5FSYNC/RAN1/Docs/R1%2D1907475%2Ezip[retrieved on May 13, 2019].

(Continued)

*Primary Examiner* — Eric Myers
(74) *Attorney, Agent, or Firm* — Procopio, Cory, Hargreaves & Savitch LLP

(57) ABSTRACT

Apparatus, methods, and computer-readable media for facilitating automatic association of pathloss reference and spatial relations for fast uplink beam switching are disclosed herein. An example method for wireless communication at a UE includes receiving a pathloss and spatial relation information linking indicator. The example method also includes determining a pathloss reference signal based on a transmit beam. The example method also includes measur- (Continued)

ing the pathloss based on the pathloss reference signal determined based on the transmit beam.

27 Claims, 12 Drawing Sheets

(51) Int. Cl.
    *H04L 5/00*         (2006.01)
    *H04W 76/27*       (2018.01)
    *H04B 7/06*         (2006.01)
    *H04L 25/02*        (2006.01)
    *H04W 52/10*       (2009.01)
    *H04W 72/044*      (2023.01)
    *H04W 80/02*       (2009.01)

(52) U.S. Cl.
    CPC ......... *H04L 25/0226* (2013.01); *H04W 16/28* (2013.01); *H04W 52/10* (2013.01); *H04W 72/046* (2013.01); *H04W 76/27* (2018.02); *H04W 80/02* (2013.01)

(58) Field of Classification Search
    CPC ......... H04W 80/02; H04W 4/80; H04W 4/70; H04W 52/42; H04W 52/146; H04B 7/0695; H04B 7/0617; H04L 5/0051; H04L 25/0226; H04L 5/0094; H04L 5/0048; H04L 27/261
    See application file for complete search history.

(56) References Cited

OTHER PUBLICATIONS

International Search Report and Written Opinion—PCT/US2020/036186—ISA/EPO—dated Aug. 27, 2020.
Motorola Mobility et al., "Remaining Details on PUCCH Resource Allocation", 3GPP Draft, R1-1804956 Remaining Details on PUCCH Resource Allocation V0, 3rd Generation Partnership Project (3GPP), Mobile Competence Centre, 650, Route Des Lucioles, F-06921 Sophia-Antipolis Cedex, vol. RAB WG1, No. Sanya, China, Apr. 16, 2018-Apr. 20, 2018 Apr. 7, 2018 (Apr. 7, 2018), XP051414282, pp. 1-3, Retrieved from the Internet: URL:http://www.3gpp.org/ftp/tsg%5Fran/WG1%5FRL1/TSGR1%5F92b/Docs/ [retrieved on Apr. 7, 2018].

* cited by examiner

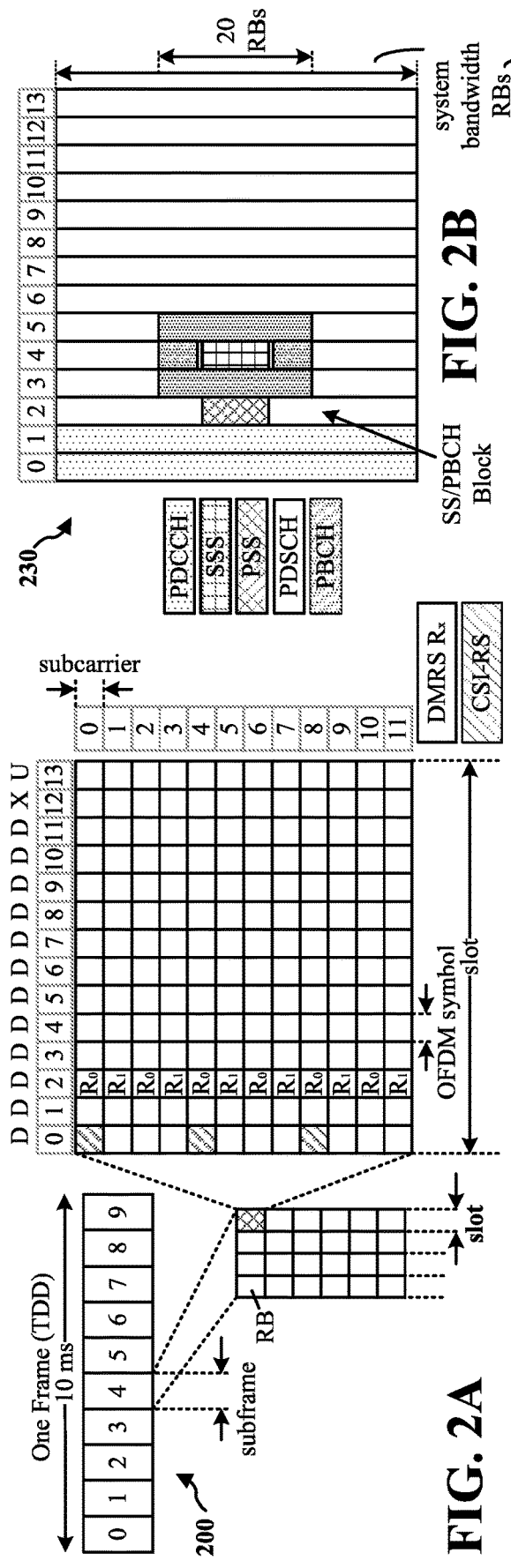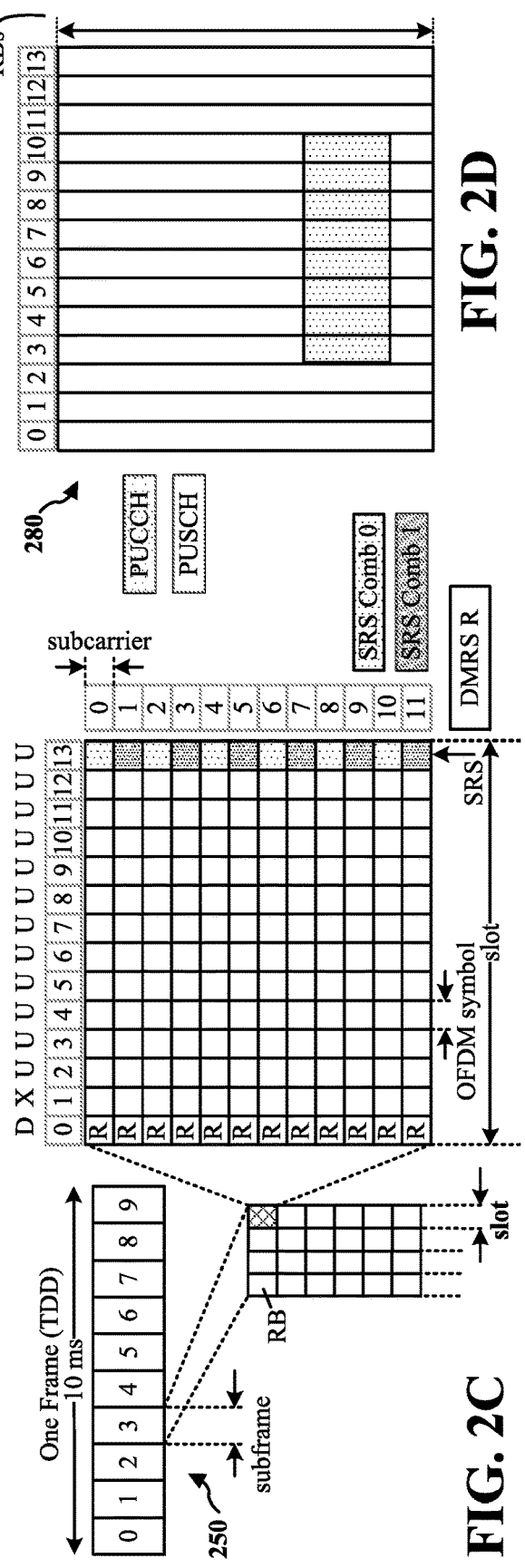

METHODS AND APPARATUS TO FACILITATE AUTOMATIC ASSOCIATION OF PATHLOSS REFERENCE AND SPATIAL RELATIONS FOR FAST UPLINK BEAM SWITCHING

CROSS REFERENCE TO RELATED APPLICATION(S)

This application claims the benefit of U.S. Provisional Patent Application Ser. No. 62/857,252, entitled "Methods AND APPARATUS TO FACILITATE AUTOMATIC ASSOCIATION OF PATHLOSS REFERENCE AND SPATIAL RELATIONS FOR FAST UPLINK BEAM Switching" and filed on Jun. 4, 2019, which is expressly incorporated by reference herein in its entirety.

BACKGROUND

Technical Field

The present disclosure relates generally to communication systems, and more particularly, to communication systems utilizing beam switching.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. An example apparatus for wireless communication at a user equipment (UE) includes receiving a pathloss and spatial relation information linking indicator. The example apparatus also includes determining a pathloss reference signal based on a transmit beam. Additionally, the example apparatus includes measuring pathloss for the transmit beam based on the determined pathloss reference signal.

In another aspect of the disclosure, a method, a computer-readable medium, and an apparatus are provided. An example apparatus for wireless communication at a UE includes determining a pathloss reference signal for a transmit beam. The example apparatus also includes measuring pathloss for the transmit beam based on the determined pathloss reference signal. Additionally, the example apparatus includes maintaining layer-3 filtering of measured pathloss for the transmit beam after the pathloss reference signal is used to measure the pathloss.

In an aspect of the disclosure, a method, a computer-readable medium, and an apparatus are provided. An example apparatus for wireless communication at base station includes transmitting, to a UE, a linking indicator providing a relationship between a spatial relation information signal and a pathloss reference signal. The example apparatus also includes receiving, from the UE, an uplink transmission using an uplink transmit power determined based on the a pathloss measured by the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G NR frame, DL channels within a 5G NR subframe, a second 5G NR frame, and UL channels within a 5G NR subframe, respectively.

DETAILED DESCRIPTION

Figure 1:
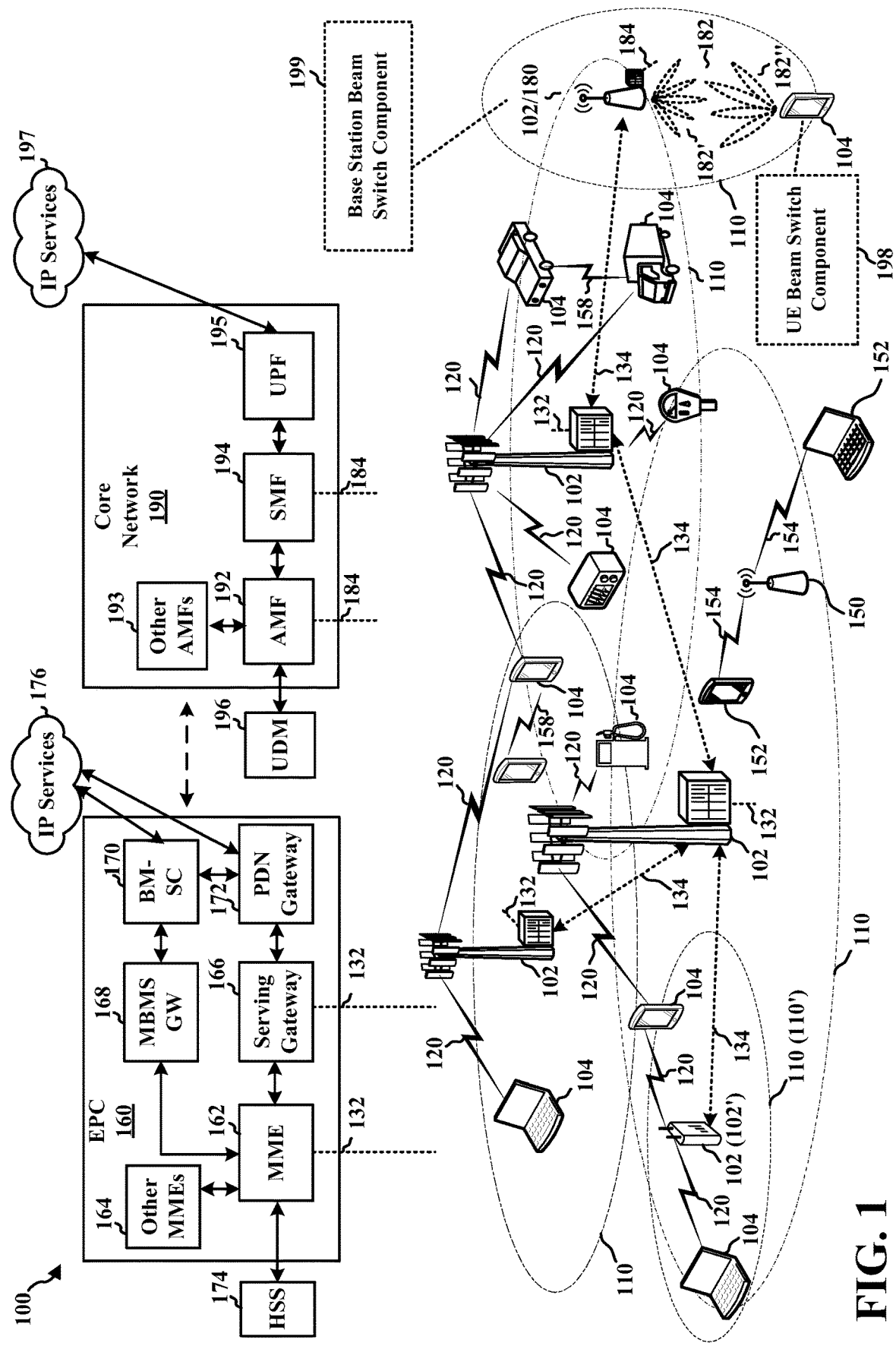
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" may be used interchangeably.

Example techniques disclosed herein enable a UE to determine a pathloss reference signal to use for measuring the current pathloss without having to receive new power control parameters identifying the pathloss reference signal. For example, the UE may determine the pathloss reference signal based on a new uplink beam, and/or based on signaling received via a radio resource control (RRC) configuration and/or a medium access control-control element (MAC-CE). In this manner, the UE may facilitate relatively fast uplink beam switching when compared to having to wait for the new power control parameters from the base station.

FIG. 1 is a diagram illustrating an example of a wireless communications system and an access network 100 that includes UEs 104 in communication with base stations 102 or base stations 108. As an example, the UE 104 may include a UE beam switch component 198 to facilitate one or more aspects of wireless communication via association of a pathloss reference and spatial relation information for fast uplink beam switching. In certain aspects, the UE beam switch component 198 may be configured to receive a pathloss and spatial relation information linking indicator. The example UE beam switch component 198 may also be configured to determine a pathloss reference signal based on a transmit beam. The example UE beam switch component 198 may also be configured to measure pathloss for the transmit beam based on the determined pathloss reference signal.

In some examples, the UE beam switch component 198 may be configured to determine a pathloss reference signal for a transmit beam. The example UE beam switch component 198 may also be configured to measure pathloss for the transmit beam based on the determined pathloss reference signal. The example UE beam switch component 198 may also be configured to maintain layer-3 filtering of measured pathloss for the transmit beam after the pathloss reference signal is used to measure the pathloss.

Still referring to FIG. 1, in certain aspects, the base station 102/180 may be configured to manage one or more aspects of wireless communication via the facilitating of fast uplink beam switching. As an example, in FIG. 1, the base station 102/180 may include a base station beam switch component 199 configured to transmit, to a UE, a linking indicator providing a relationship between a spatial relation information signal and a pathloss reference signal. The base station beam switch component 199 may also be configured to receive, from the UE, an uplink transmission using an uplink transmit power determined based on the a pathloss measured by the UE.

Although the following description is focused on efficient beam switching by a UE after a beam switch request is received, it may be appreciated that the concepts described herein may be applicable to additional or alternative examples where a beam switch is not requested. For example, a UE may determine based on spatial relation information signals that a beam switch may be beneficial and, thus proceed with implementing the example techniques disclosed herein. In additional or alternative examples, the UE may receive an updated relationship between a spatial relation information signal and a pathloss reference signal and determine to proceed to with implementing the example techniques disclosed herein. Furthermore, while the following description provides examples of uplink communications, it may be appreciated that the concepts described herein may be applicable to downlink communications and/or sidelink communications. Moreover, although the following description provides examples related to 5G NR, the concepts described herein may be applicable to other similar areas, such as LTE, LTE-A, CDMA, GSM, and/or other wireless technologies, in which fast uplink beam switching may improve communications.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The electromagnetic spectrum is often subdivided by various authors or entities into different classes, bands, channels, or the like, based on frequency/wavelength. For example, in 5G NR two initial operating bands have been identified as frequency range designations FR1 (410 MHz-7125 MHz) and FR2 (24250 MHz-52600 MHz). Even though a portion of FR1 is greater than 6 GHz (>6000 MHz), FR1 is often referred to (interchangeably) as a Sub-6 GHz band in various documents and articles regarding 5G NR topics. A similar nomenclature issue sometimes occurs with regard to FR2 in various documents and articles regarding 5G NR topics. While a portion of FR2 is less than 30 GHz (<30000 MHz), FR2 is often referred to (interchangeably) as a millimeter wave band. However, some authors/entities tend to define wireless signals with wavelengths between 1-10 millimeters as falling within a millimeter wave band (30 GHz-300 GHz).

With the above examples in mind, unless specifically stated otherwise, it may be understood that the term "sub-6 GHz" if used herein by way of example may represent all or part of FR for 5G NR. Further, unless specifically stated otherwise, it may be understood that the term "millimeter wave" as used herein by way of example may represent all or part of FR2 for 5G NR and/or all or part of a 30 GHz-300 GHz waveband. It may also be understood that the terms "sub-6 GHz" and "millimeter wave," are intended to represent modifications to such example frequency bands that may occur do to author/entity decisions regarding wireless communications, e.g., as presented by example herein.

It may be understood that the above examples are not necessarily intended to limit claimed subject matter. For example, unless specifically recited, claimed subject matter relating to wireless communications is not necessarily intended to be limited to any particular author/entity defined frequency band, or the like.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 29 slots/subframe. The subcarrier spacing and symbol length/duration are a function of the numerology. The subcarrier spacing may be equal to $2*15$ kHz, where y is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
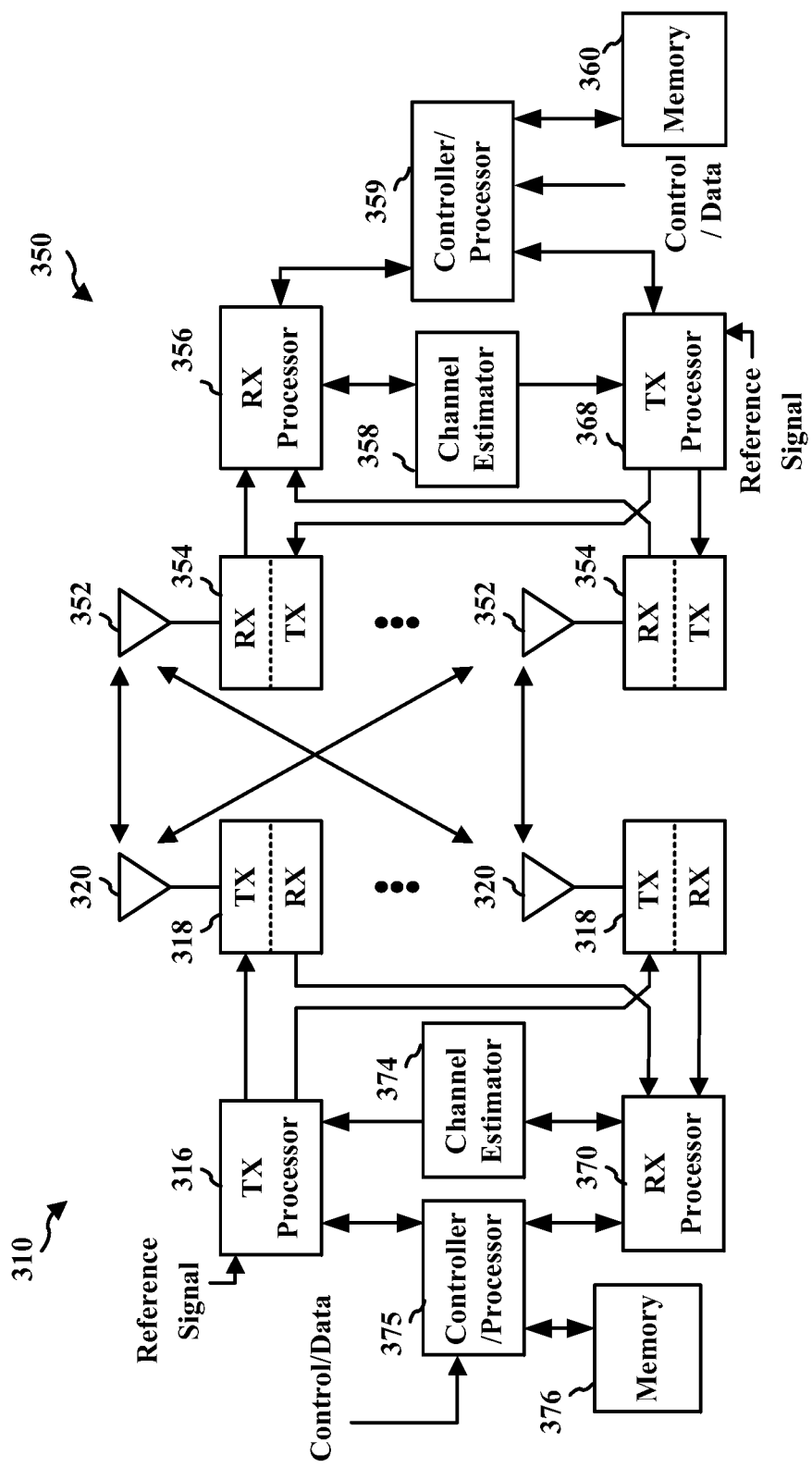
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection the UE beam switch component 198 of FIG. 1.

At least one of the TX processor 316, the RX processor 370, and the controller/processor 375 may be configured to perform aspects in connection with the base station beam switch component 199 of FIG. 1.

When a UE changes an uplink beam for transmitting an uplink transmission (e.g., for an uplink control channel, for an uplink shared channel, etc.), the UE determines an uplink transmit power for transmitting the uplink transmission. In some examples, the uplink transmit power may be based on a current pathloss between the UE and a base station. For example, the UE may measure the current pathloss and then determine the uplink transmit power.

In some examples, the base station may instruct the UE on which reference signal to use to measure the current pathloss. For example, the base station may provide the UE power control parameters identifying the reference signal to use to measure the current pathloss (sometimes referred to as a "pathloss reference signal" or a "pathlossReferenceRS") via radio resource control (RRC) signaling. However, in some examples, the time it takes the UE to receive the RRC message and to decode the RRC message may result in a relatively long delay. Furthermore, during the delay, a period of uncertainty may also be introduced because the UE may not transmit using an appropriate uplink transmit power, resulting in general degradation in communications.

Example techniques disclosed herein enable a UE to determine a pathloss reference signal to use for measuring the current pathloss without having to receive new power control parameters identifying the pathloss reference signal. For example, the UE may determine the pathloss reference signal based on the new uplink beam, and/or based on signaling received via an RRC configuration and/or a MAC-CE. In this manner, disclosed techniques enable the UE to facilitate relatively fast uplink beam switching when compared to having to wait for the new power control parameters from the base station.

Figure 4:
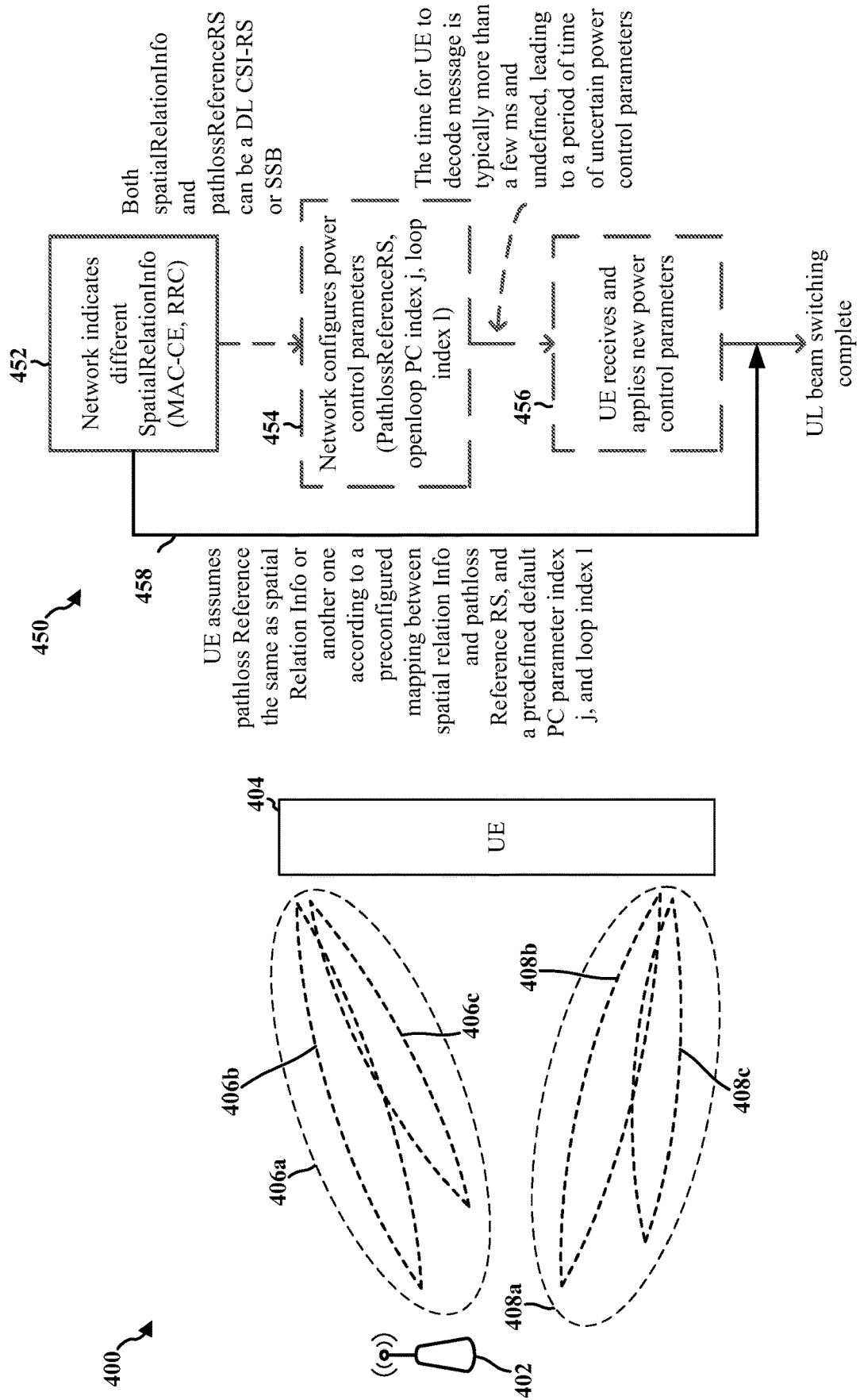
FIG. 4A is a diagram illustrating an example of a base station in communication with a UE, in accordance with the teachings disclosed herein.
FIG. 4B is an example flowchart of wireless communication, in accordance with the teachings disclosed herein.

FIG. 4A is a diagram 400 illustrating a base station 402 in communication with a UE 404. Referring to FIG. 4A, the base station 402 may transmit one or more beamformed signals to the UE 404 in different directions 406*a*, 406*b*, 406*c*, 408*a*, 408*b*, 408*c*. The UE 404 may find the best receive direction for each of the beamformed signals from the base station 402. The base station 402/UE 404 may perform beam training to determine the best receive and transmit directions. It may be appreciated that the UE 404 may or may not transmit in the same direction as a receive direction. In some examples, when a device (e.g., the UE 404) is able to transmit in a direction relatively close to a previous receive direction (e.g., based on one or more criteria), the device may be considered to be operating with receive and transmit beam correspondence.

In the illustrated example of FIG. 4A, the base station 402 may provide the UE 404 an SRS resource set including one or multiple SRS resources and indicate beam directions 406*a*, 406*b*, 406*c*, 408*a*, 408*b*, 408*c* for each of the resources in the form of spatial relation information signals. It may be appreciated that resources in a resource set may be associated with different beam directions and, thus, may a resource set may be associated with multiple spatial relation information signals.

In some examples, a PUSCH transmission may use a precoder based on the transmission of one or more SRS resources in the resource set. To indicate the precoder and the selected SRS resources, the base station 402 may provide an SRS resource indicator (SRI) in DCI that schedules a PUSCH. In some examples, the base station 402 may provide power control parameters for each of the SRI. For example, an SRI may be associated with a pathloss reference signal, an open-loop parameter index called "p0-PUSCH-AlphaSetId," and a closed loop index. As described above, in some examples, the power control parameters associated with each of the SRIs may be provided by the base station 402 via RRC signaling, which may result in delays at beam switch before the UE 404 is able to decode and apply the power control parameters for UL transmissions.

As an illustrative example, the UE 404 may be configured to transmit UL transmissions to the base station 402 in one or more of the beam directions 406*a*, 406*b*, 406*c* (collectively referred to herein as "directions 406") at a first time. The UE 404 may transmit the UL transmission via the one or more beam directions 406 at a first uplink transmit power based on, for example, a current pathloss measured between the UE 404 and the base station 402 for the one or more directions 406 of a first UL beam.

FIG. 4B illustrates a flowchart of example communication 450 for the base station 402 and the UE 404 of FIG. 4A. At a later time (e.g., as illustrated at 452), the UE 404 may receive instructions from the base station 402 to switch UL beams. The base station 402 may indicate new spatial information for the UE (e.g., new spatial relation information signal(s) provided via a MAC-CE or RRC signaling). For example, the base station 402 may instruct the UE 404 to switch UL beams to one or more of the beam directions 408*a*, 408*b*, 408*c* (collectively referred to herein as "directions 408") via a beam switch request. The UE 404 may then switch UL beams to one or more of the beam directions 408 and transmit uplink transmissions with a second uplink transmit power based on a current pathloss measured between the UE 404 and the base station 402 for the one or more directions 408 of a second UL beam.

As described above, in some examples, before the UE 404 is able to transmit at the second uplink transmit power, the UE 404 may have to wait to receive new power control parameters associated with the one or more beam directions 408 from the base station 402 via RRC signaling, then decode the RRC message before measuring the current pathloss and determining the second uplink transmit power. As illustrated at 454, the base station 402 may provide power control parameters for each of the SRI. For example, an SRI may include a pathloss reference signal, an open-loop parameter index (e.g., "p0-PUSCH-AlphaSetId"), and a closed loop index. After receiving the new configured power control parameters at 454, the UE may decode the RRC message, or other message, and apply the new power control parameters, at 456. Thus, the UE may use the new configured power control parameters to measure a pathloss and determine an uplink transmission power.

However, example techniques disclosed herein enable the UE 404 to associate (or map) pathloss reference signals to beams. For example, techniques disclosed herein enable the base station 402 to signal to the UE 404 to facilitate linking of pathloss reference signals and spatial relation information signals (sometimes referred to as "beam directions"). Once the UE 404 receives such signaling from the base station 402, if the UE 404 receives a beam switch request to switch from a first beam to a second beam or determines that performing a beam switch may be beneficial (e.g., to improve communication between the UE 404 and the base station 402), the UE 404 is able to determine the pathloss reference signal based on the spatial relation information signal of the second beam, as illustrated at 458, and without waiting for RRC signaling from the base station 402 to configure the pathloss reference signal. The UE 404 is then able to measure a current pathloss based on the determined pathloss reference signal and also determine the second uplink transmit power. In this manner, example techniques disclosed herein facilitate fast UL beam switching.

It may be appreciated that while the first beam directions 406 do not overlap with the second beam directions 408 in the example diagram 400 of FIG. 4A, in other examples, any suitable quantity of beam directions may overlap. Furthermore, it may be appreciated that in other examples, the UE 404 may transmit using any suitable quantity of beam directions 406a, 406b, 406c, 408a, 408b, 408c.

Figure 5:
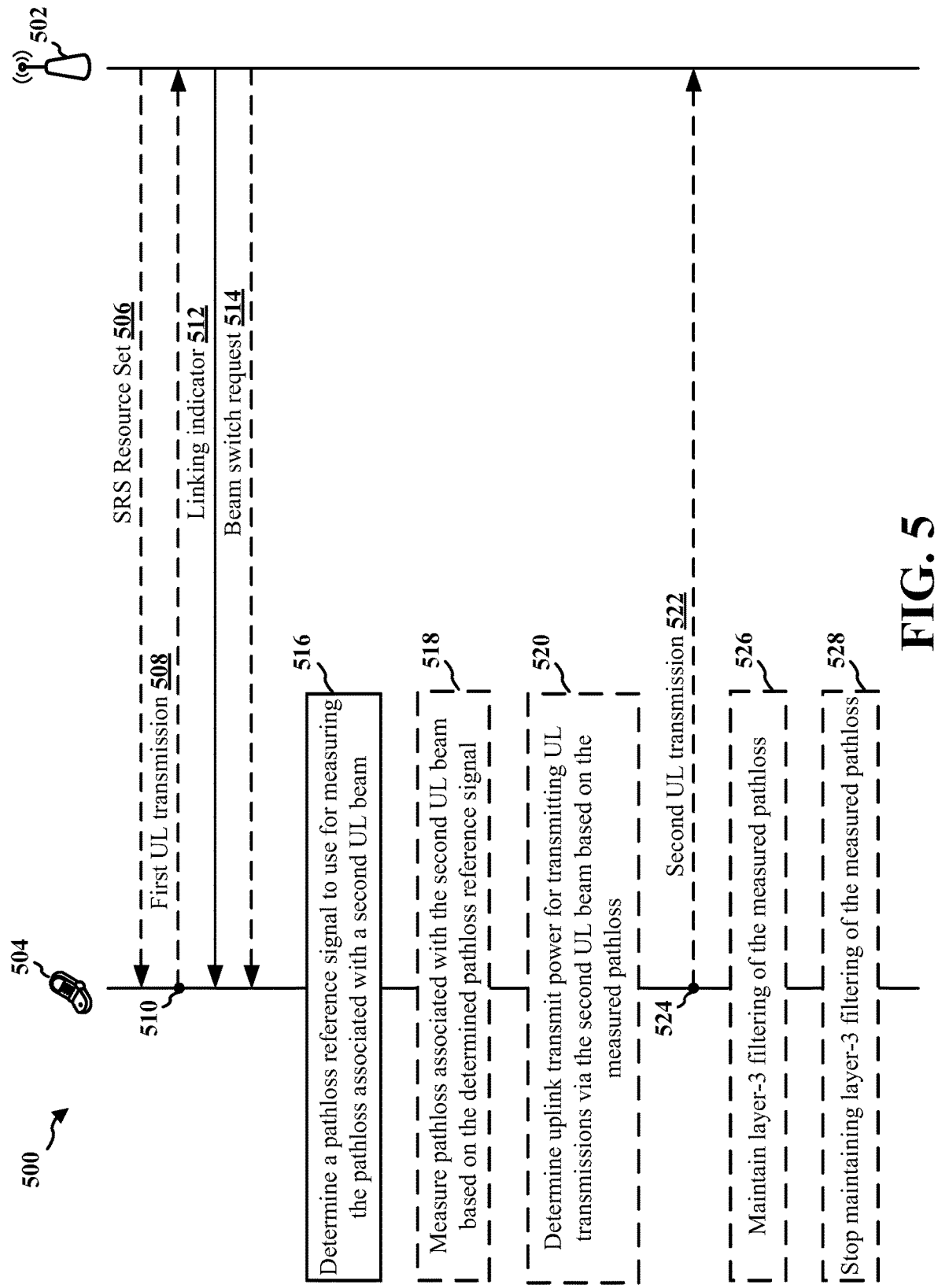
FIG. 5 is an example communication flow between a base station and a UE, in accordance with the teachings disclosed herein.

FIG. 5 illustrates an example of wireless communication 500 between a base station 502 and a UE 504, as presented herein. One or more aspects of the base station 502 may be implemented by the base station 102/180 of FIG. 1, the base station 310 of FIG. 3, and/or the base station 402 of FIG. 4A. One or more aspects of the UE 504 may be implemented by the UE 104 of FIG. 1, the UE 350 of FIG. 3, and/or the UE 404 of FIG. 4A.

It may be appreciated that while the wireless communication 500 includes one base station 502 in communication with one UE 504, in additional or alternative examples, the base station 502 may be in communication with any suitable quantity of UEs and/or other base stations, and/or the UE 504 may be in communication with any suitable quantity of base stations and/or other UEs. Thus, while certain of the transmissions between the base station 502 and the UE 504 are described as uplink transmissions and downlink transmissions, in other examples, any of the transmissions may additionally or alternatively be sidelink transmissions.

In the illustrated example of FIG. 5, the base station 502 and the UE 504 are in communication. For example, the base station 502 may transmit an SRS resource set 506 that is received by the UE 504 to configure the UE 504. The base station 502 may also configure power control parameters of one or more SRIs for the UE 504 to use when determining an uplink transmit power for an UL transmission. For example, the UE 504 may transmit a first uplink transmission 508 that is received by the base station 502 via a first UL beam 510 and at a first uplink transmit power. The first UL beam 510 may correspond to one or more of the first beam directions 406 of FIG. 4A. The first uplink transmission 508 may be SRS, an uplink shared channel (e.g., PUSCH), and/or an uplink control channel (e.g., PUCCH).

In the illustrated example of FIG. 5, the base station 502 may also provide the UE 504 a linking indicator 512. The linking indicator 512 may indicate to the UE 504 that the UE 504 may use the spatial relation of a beam to determine the pathloss reference signal to use for measuring the new pathloss. For example, the linking indicator 512 may indicate a relationship between a pathloss reference signal and a spatial relation information signal. In some examples, the base station 502 may transmit the linking indicator 512 via RRC signaling. In some examples, the base station 502 may transmit the linking indicator 512 via a MAC-CE. In some examples, the linking indicator 512 may indicate an activation of the relationship between the pathloss reference signal and the spatial relation.

In some examples, the base station 502 may provide a mapping of a set of pathloss reference signals to a set of UL beams (e.g., spatial relation information signals). In some examples, the set of pathloss reference signals may include one pathloss reference signal. In some examples, the set of UL beams may include one UL beam.

For example, the UE 504 may be capable of transmitting via one of 32 beams. In some examples, the mapping may map one pathloss reference signal to one UL beam (e.g., a one-to-one mapping). In some examples, the mapping may map one pathloss reference signal to a plurality of UL beams. For example, referring to FIG. 4A, the mapping may indicate that a first pathloss reference signal maps to any one or more of the second beam directions 408. In some examples, the base station 502 may provide the mapping via a MAC-CE. In some examples, the base station 502 may provide the mapping with the linking indicator 512.

Although FIG. 5 illustrates the base station 502 provides the linking indicator 512 to the UE 504 after the UE 504 transmits the first UL transmission 508, it may be appreciated that in other examples, the base station 502 may provide the linking indicator 512 at any other reasonable time. For example, the base station 502 may transmit the linking indicator 512 before, with (e.g. at the same time), or after transmitting the SRS resource set 506 to the UE 504.

In the illustrated example of FIG. 5, after transmitting the first UL transmission 508 via the first UL beam 510, the UE 504 may receive a beam switch request 514 from the base station 502. The beam switch request 514 may instruct the UE 504 to switch from the first UL beam 510 to a second UL beam. In some examples, the beam switch request 514 may indicate the second UL beam (e.g., the beam switch request 514 may configure the second UL beam).

At 516, the UE 504 may determine a pathloss reference signal to use for measuring the pathloss associated with the second UL beam. For example, the UE 504 may determine the pathloss reference signal based on the linking (or relationship) between the pathloss reference signal and the second UL beam. In some examples, the UE 504 may determine the pathloss reference signal based on the second UL beam when the pathloss reference signal is not configured by the base station 502.

In some examples, the UE 504 may identify the second UL beam. For example, the beam switch request 514 may include a set of resources and each of the resources may be associated with a respective beam. In some such examples, the UE 504 may identify the second UL beam as the beam with a lowest beam identifier. However, it may be appreciated that other techniques for the UE 504 identifying the second UL beam may additionally or alternatively be used.

In some examples, the beam switch request 514 may be associated with an uplink shared channel (e.g., PUSCH) associated with two or more beams. In some such examples, the UE 504 may identify the second UL beam as the beam associated with a lowest SRS resource identifier. However, it may be appreciated that other techniques for the UE 504 identifying the second UL beam may additionally or alternatively be used.

At 518, the UE 504 may measure the pathloss associated with the second UL beam based on the determined pathloss reference signal. At 520, the UE 504 may the determine the uplink transmit power for transmitting uplink transmissions via the second UL beam based on the measured pathloss. The UE 504 may then transmit a second uplink transmission 522 via a second UL beam 524 and at the uplink transmit power.

At 526, the UE 504 may maintain layer-3 filtering of measured pathloss. For example, the UE 504 may maintain layer-3 filtering of measured pathloss for the second UL beam 524. In some examples, the UE 504 may maintain the layer-3 filtering of the measured pathloss for the second UL beam 524 after the pathloss reference signal is used to measure the second pathloss.

At 528, the UE 504 may stop maintaining the layer-3 filtering of the measured pathloss for the second UL beam 524 after a threshold period following use of the pathloss reference signal to measure the second pathloss occurs. For example, if the UE 504 determines that the pathloss reference signal has not been used to measure the second pathloss for a period that is equal to (or greater than) the threshold period, the UE 504 may stop maintaining the layer-3 filtering of the measured pathloss for the second UL beam 524.

In some examples, the UE 504 may additionally or alternatively use layer-1 RSRP for pathloss measurements.

It may be appreciated that while the UE 504 of FIG. 5 determines the pathloss reference signal based on the second UL beam after the beam switch request 514 is determined, in additional or alternative examples, the UE 504 may determine the pathloss reference signal for a second UL beam without receiving the beam switch request 514.

Figure 6:
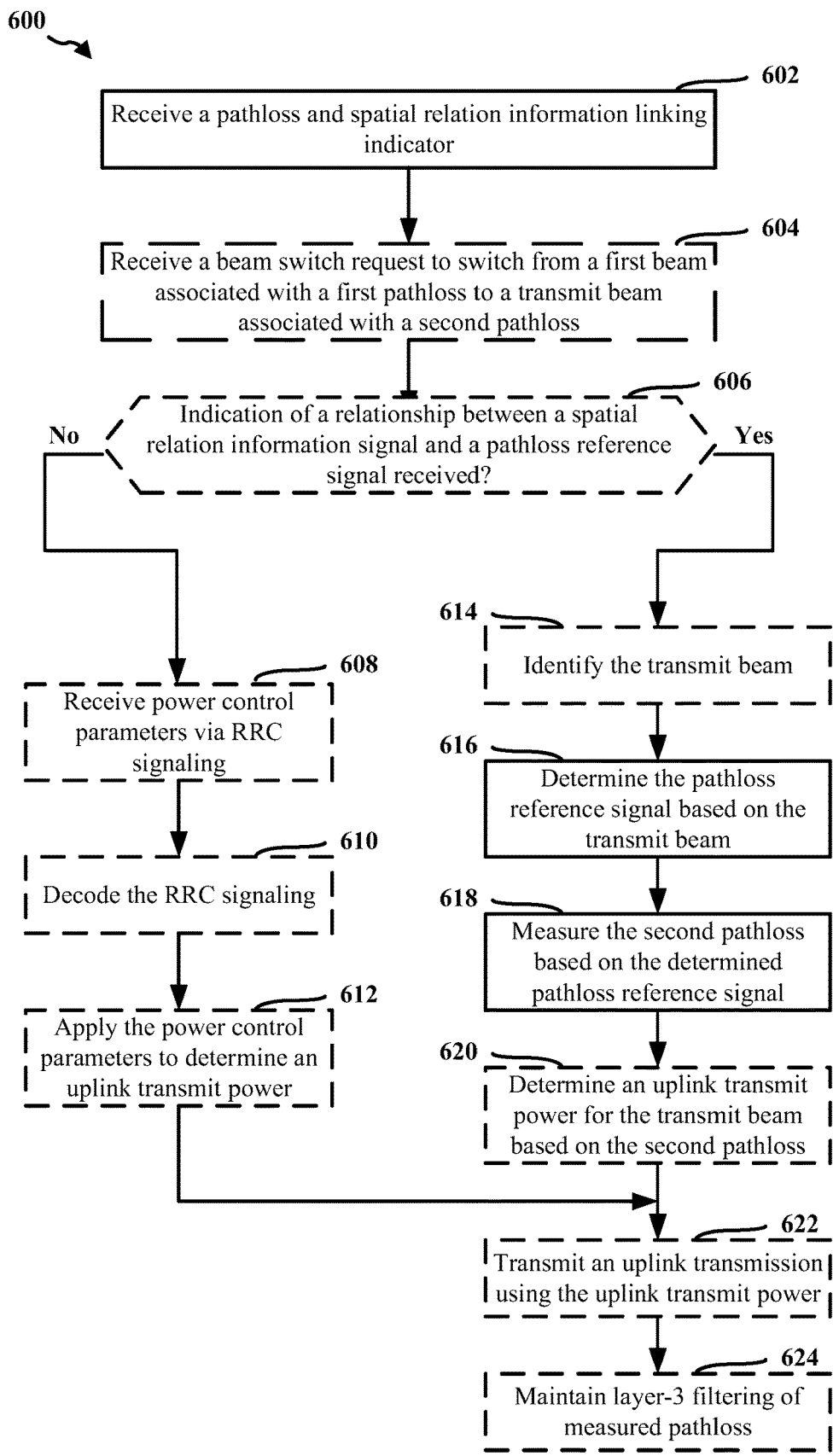
FIG. 6 is a flowchart of a method of wireless communication at a UE, in accordance with the teachings disclosed herein.

FIG. 6 is a flowchart 600 of a method of wireless communication. The method may be performed by a UE (e.g., the UE 104, the UE 350, the UE 404, the UE 504, the UE 1150, the apparatus 802/802', and/or the processing system 914, which may include the memory 360 and which may be the entire UE 350 or a component of the UE 350, such as the TX processor 368, the RX processor 356, and/or the controller/processor 359). Optional aspects are illustrated with a dashed line. The example flowchart 600 of FIG. 6 facilitates a UE performing fast UL beam switching, and resulting in improved cell coverage by reducing periods of uncertainty due to less than optimal uplink transmit powers.

At 602, the UE receives a pathloss and spatial relation information linking indicator, as described in connection with, for example, the linking indicator 512 of FIG. 5. For example, a relationship component 806 of apparatus 802 may facilitate the receiving of the indication of the relationship. In some examples, the UE may receive the pathloss and spatial relation information linking indicator from a base station. In some examples, the pathloss and spatial relation information linking indicator provides an indication of a relationship between a spatial relation information signal and a pathloss reference signal. In some examples, the pathloss and spatial relation information linking indicator may include an RRC configuration indicating the relationship between the spatial relation information signal and a pathloss reference signal. In some examples, the pathloss and spatial relation information linking indicator may include an activation and/or an updating of the relationship between the spatial relation information signal and the pathloss reference signal. In some such examples, the activation and/or the updating may be received in a MAC-CE.

At 604, the UE may receive a beam switch request to switch from a first beam associated with a first pathloss to a transmit beam (e.g., a second beam) associated with a second pathloss, as described in connection with, for example, the beam switch request 514 of FIG. 5. For example, a beam switching component 808 of the apparatus 802 may facilitate the receiving of the beam switch request. In some examples, the beam switch request may be received for at least one of SRS, an uplink shared channel, and/or an uplink control channel.

At 606, the UE may determine whether the UE received an indication of a relationship between a spatial relation information signal and a pathloss reference signal. For example, the relationship component 806 of the apparatus 802 may facilitate the determining of whether the UE received the pathloss and spatial relation information linking indicator providing an indication of the relationship between the spatial relation information signal and the pathloss reference signal (e.g., at 602).

If, at 606, the UE determined that the UE did not receive the indication of the relationship, then, at 608, the UE may wait to receive power control parameters from the base station. For example, a power control component 810 of the apparatus 802 may facilitate the receiving of the power control parameters from the base station. In some examples, the UE may receive the power control parameters via RRC signaling. At 610, the UE may decode the RRC signaling. For example, the power control component 810 of the apparatus 802 may facilitate the decoding of the RRC signaling to determine the power control parameters associated with the second beam. The power control parameters may include a pathloss reference signal, an open-loop parameter index (e.g., "p0-PUSCH-AlphaSetID"), and a closed-loop index.

At 612, the UE may apply the power control parameters to determine an uplink transmit power for transmitting uplink transmissions via the transmit beam. For example, a transmit power component 812 of the apparatus 802 may facilitate the determining of the uplink transmit power. In some examples, the UE may determine the uplink transmit power based on a pathloss measured based on the pathloss reference signal determined from the decoded power control parameters. Control may then proceed to 622 to transmit an uplink transmission using the determined uplink transmit power.

If, at 606, the UE determined that the UE did receive the indication of the relationship, then, at 614, the UE may identify the transmit beam. For example, a beam identifier component 814 of the apparatus 802 may facilitate the identifying of the transmit beam. In some examples, the UE may identify the transmit beam based on a pathloss reference signal. For example, an uplink transmission may include and/or may be based on a set of resources and each of the resources may be associated with a respective beam direction or a spatial relation information signal. In some such examples, the UE may identify the pathloss reference signal based on the spatial relation information signal associated with a lowest identifier. In some examples, the uplink transmission may include and/or may be based on a set of resources and each of the resources may be associated with a respective beam and a beam identifier. In some such examples, the UE may identify the pathloss reference signal based on the spatial relation information signal associated with a lowest SRS resource identifier.

At 616, the UE determines the pathloss reference signal based on the transmit beam, as described in connection with, for example, 516 of FIG. 5. For example, a pathloss component 816 of the apparatus 802 may determine the pathloss reference signal based on the transmit beam. In some examples, the UE may determine the pathloss reference signal based on the transmit beam when the pathloss reference signal is not configured by the base station.

In some examples, the UE may determine the pathloss reference signal by directly mapping the transmit beam to the pathloss reference signal. For example, the transmit beam may correspond to a CSI-RS (e.g., CSI-RS_31). In some such examples, the UE may determine the CSI-RS as the pathloss reference signal.

In some examples, the UE may receive a mapping between one or more pathloss reference signals to a set of beams (e.g., spatial relation information signals). For example, the UE may receive the mapping via MAC-CE signaling from the base station. In some examples, the set of beams may include one beam. In some such examples, a one-to-one relationship may exist between a pathloss reference signal and a beam (or a spatial relation information signal). In some examples, the set of beams may include a plurality of beams. In some such examples, the mapping may indicate how to determine the pathloss reference signal based on the identified second beam.

For example, a UE may be capable of transmitting via 32 different UL beams. In some such examples, if the mapping indicates a one-to-one relationship between the pathloss reference signals and the beams, then the UE is able to directly determine the pathloss reference signal based on the identified transmit beam (e.g., use CSI-RS_31 when the identified transmit beam is beam 31, etc.). In other examples, the mapping may indicate that a plurality of beams map to one pathloss reference signal. For example, the mapping may indicate that beams 1 to 4 map to a first pathloss reference signal, beams 5 to 8 map to a second pathloss reference signal, etc. In some such examples, based on the identified transmit beam, the UE may determine the pathloss reference signal. It may be appreciated that in other examples, other reasonable mappings between the quantity of pathloss reference signals and the quantity of beams may additionally or alternative be used.

At 618, the UE measures the second pathloss associated with the transmit beam based on the determined pathloss reference signal, as described in connection with, for example, 518 of FIG. 5. For example, the pathloss component 816 of the apparatus 802 may facilitate the measuring of the second pathloss associated with the transmit beam based on the determined pathloss reference signal. In some examples, the UE may apply a default set of open-loop power control parameters or a set of open-loop power control parameters with a default index (e.g., P0-PUSCH-AlphaSetId=2) to measure the second pathloss based on the pathloss reference signal when, for example, the open-loop power control parameters have not been configured, for example, by a base station.

At 620, the UE may determine an uplink transmit power for the transmit beam based on the second pathloss, as described in connection with, for example, 520 of FIG. 5. For example, the transmit power component 812 of the apparatus 802 may determine the uplink transmit power.

At 622, the UE may transmit an uplink transmission using the uplink transmit power, as described in connection with, for example, the second uplink transmission 522 of FIG. 5. For example, a transmission component 818 of the apparatus 802 may facilitate the transmitting of the uplink transmission using the uplink transmit power.

At 624, the UE may maintain layer-3 filtering of measured pathloss, as described in connection with, for example, 526 of FIG. 5. For example, the pathloss component 816 of the apparatus 802 may maintain the layer-3 filtering of measured pathloss. In some examples, the UE may maintain layer-3 filtering of measured pathloss for the transmit beam after the pathloss reference signal is used to measure the second pathloss. In some examples, the UE may stop maintaining the layer-3 filtering of the measured pathloss for the transmit beam after a threshold period following use of the pathloss reference signal to measure pathloss.

Figure 7:
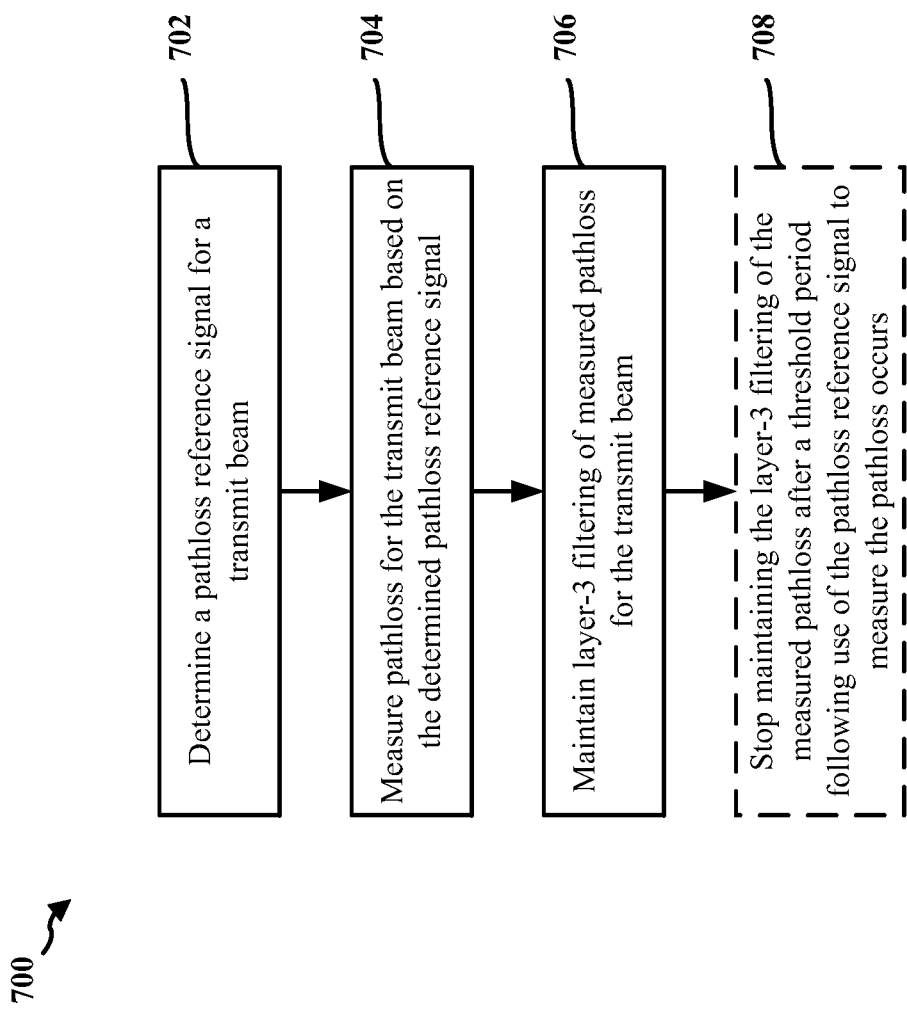
FIG. 7 is another flowchart of a method of wireless communication at a UE, in accordance with the teachings disclosed herein.

FIG. 7 is a flowchart 700 of a method of wireless communication. The method may be performed by a UE (e.g., the UE 104, the UE 350, the UE 404, the UE 504, the UE 1150, the apparatus 802/802', and/or the processing system 914, which may include the memory 360 and which may be the entire UE 350 or a component of the UE 350, such as the TX processor 368, the RX processor 356, and/or the controller/processor 359). Optional aspects are illustrated with a dashed line. The example flowchart 700 of FIG. 7 facilitates a UE performing fast UL beam switching, and resulting in improved cell coverage by reducing periods of uncertainty due to less than optimal uplink transmit powers.

At 702, the UE determines a pathloss reference signal for a transmit beam, as described in connection with, for example, 516 of FIG. 5. For example, a pathloss component 816 of apparatus 802 may determine the pathloss reference signal based on a transmit beam. In some examples, the UE may determine the pathloss reference signal based on the transmit beam when the pathloss reference signal is not configured by the base station.

In some examples, the UE may determine the pathloss reference signal based on receiving signaling of the second pathloss reference signal via an RRC configuration. In some examples, the UE may determine the pathloss reference signal based on receiving signaling of the second pathloss reference signal via a MAC-CE. In some examples, the UE may determine the pathloss reference signal based on activating the pathloss reference signal based on the transmit beam.

In some examples, the UE may determine the pathloss reference signal by directly mapping the transmit beam to the pathloss reference signal. For example, the transmit beam may correspond to a CSI-RS (e.g., CSI-RS_31). In some such examples, the UE may determine the CSI-RS as the pathloss reference signal.

In some examples, the UE may receive a mapping between one or more pathloss reference signals to a set of beams (e.g., spatial relation information signals). For example, the UE may receive the mapping via MAC-CE signaling from the base station. In some examples, the set of beams may include one beam. In some such examples, a one-to-one relationship may exist between a pathloss reference signal and a beam (or a spatial relation information signal). In some examples, the set of beams may include a plurality of beams. In some such examples, the mapping may indicate how to determine the pathloss reference signal based on the identified second beam.

At 704, the UE measures pathloss associated with the transmit beam based on the determined pathloss reference signal, as described in connection with, for example, 518 of FIG. 5. For example, the pathloss component 816 of the apparatus 802 may facilitate the measuring of the pathloss associated with the transmit beam based on the determined pathloss reference signal. In some examples, the UE may apply a default set of open-loop power control parameters or a set of open-loop power control parameters with a default index (e.g., P0-PUSCH-AlphaSetId=2) to measure the pathloss for the transmit beam based on the pathloss reference signal when, for example, the open-loop power control parameters have not been configured, for example, by a base station.

At 706, the UE maintains layer-3 filtering of measured pathloss for the transmit beam, as described in connection with, for example, 526 of FIG. 5. For example, the pathloss component 816 of the apparatus 802 may maintain the layer-3 filtering of measured pathloss. In some examples, the UE may maintain layer-3 filtering of measured pathloss for the transmit beam after the pathloss reference signal is used to measure the second pathloss.

At 708, the UE may stop maintaining the layer-3 filtering of the measured pathloss for the transmit beam after a threshold period following use of the pathloss reference signal to measure pathloss occurs, as described in connection with, for example, 528 of FIG. 5. For example, the pathloss component 816 of the apparatus 802 may stop maintaining the layer-3 filtering of measured pathloss.

Figure 8:
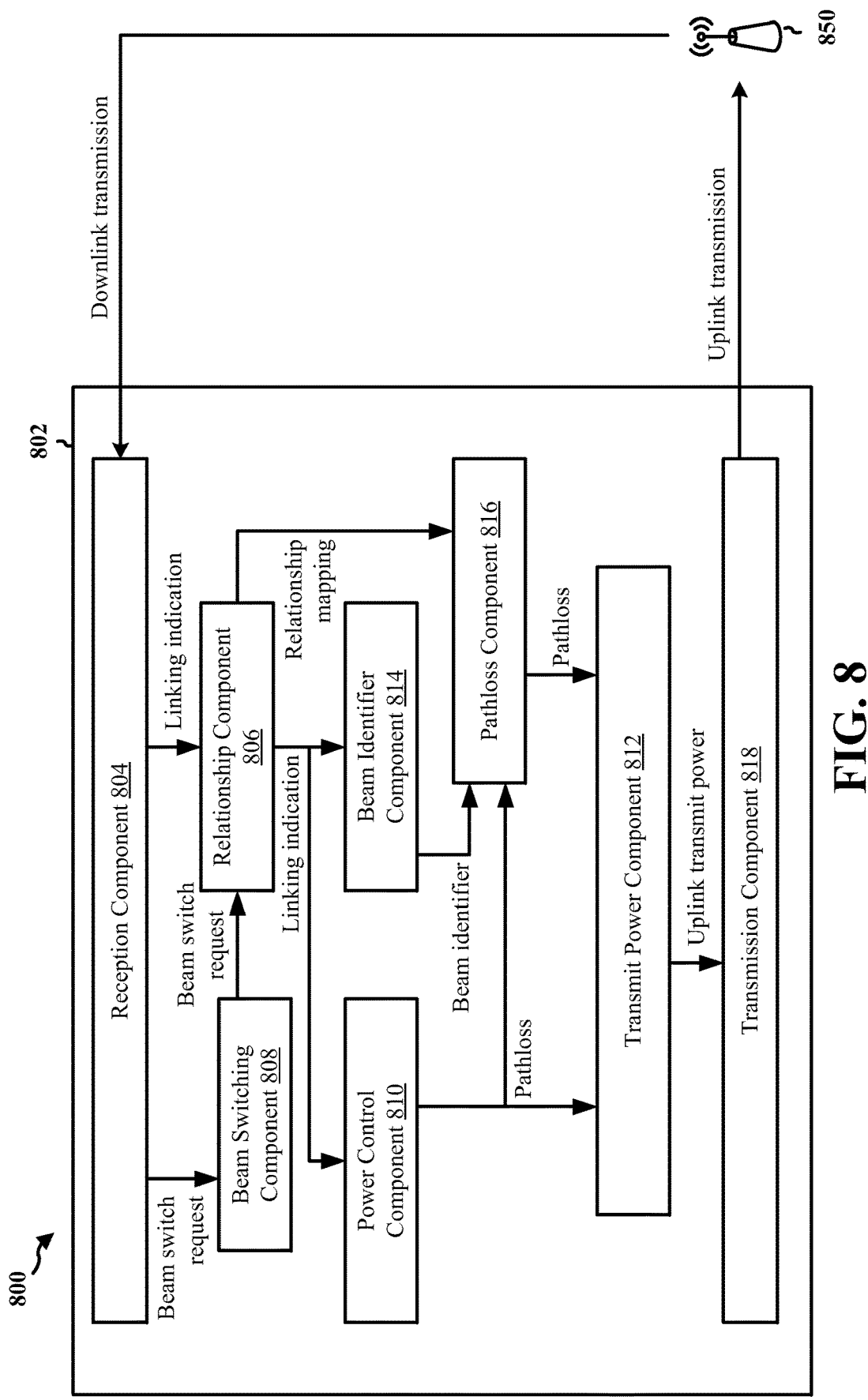
FIG. 8 is a conceptual data flow diagram illustrating the data flow between different means/components in an example apparatus, in accordance with the teachings disclosed herein.

FIG. 8 is a conceptual data flow diagram 800 illustrating the data flow between different means/components in an example apparatus 802 in communication with a base station 850. The apparatus 802 may be a UE or a component of a UE. The apparatus 802 may perform the method of flowchart 600 and/or the flowchart 700. The apparatus 802 includes a reception component 804, a relationship component 806, a beam switching component 808, a power control component 810, a transmit power component 812, a beam identifier component 814, a pathloss component 816, and a transmission component 818. The base station 850 may include the same or similar component as shown with respect to the base station 102/180 of FIG. 1, the base station 310 of FIG. 3, the base station 402 of FIG. 4A, the base station 502 of FIG. 5, and/or the apparatus 1102/1102' of FIGS. 11/12.

The reception component 804 may be configured to receive various types of signals/messages and/or other information from other devices, including, for example, the base station 850. The messages/information may be received via the reception component 804 and provided to one or more components of the apparatus 802 for further processing and/or use in performing various operations. For example, the reception component 804 may be configured to receive signaling including, for example, a pathloss and spatial relation information linking indicator, a relationship mapping, a beam switch request, and/or RRC signaling of power control parameters (e.g., as described in connection with 602, 604, and/or 608). The reception component 804 may additionally or alternatively be configured to receive signaling including, for example, an RRC configuration and/or a MAC-CE related to a pathloss reference signal (e.g., as described in connection with 702).

The relationship component 806 may be configured to receive an indication of a relationship between a spatial relation and the pathloss reference signal (e.g., the pathloss and spatial relation information linking indicator) and/or determine whether the UE received an indication of a relationship between a spatial relation and a pathloss reference signal (e.g., as described in connection with 602 and/or 608).

The beam switching component 808 may be configured to receive a beam switch request to switch from a first beam associated with a first pathloss to a second beam associated with a second pathloss (e.g., as described in connection with 604).

The power control component 810 may be configured to receive power control parameters from the base station and/or decode the RRC signaling (e.g., as described in connection with 608 and/or 610).

The transmit power component 812 may be configured to apply the power control parameters to determine an uplink transmit power for transmitting uplink transmissions via the second beam and/or determine an uplink transmit power for the second beam based on the second pathloss (e.g., as described in connection with 612 and/or 620).

The beam identifier component 814 may be configured to identify the transmit beam (e.g., as described in connection with 614).

The pathloss component 816 may be configured to determine the pathloss reference signal based on the transmit beam, measure the second pathloss associated with the transmit beam based on the determined pathloss reference signal, maintain layer-3 filtering of measured pathloss, and/or stop maintaining layer-3 filtering of measured pathloss (e.g., as described in connection with 616, 618, 624, 704, 706, and/or 708).

The transmission component 818 may be configured to transmit various types of signals/messages and/or other information to other devices, including, for example, the base station 850. For example, the transmission component 818 may be configured to transmit an uplink transmission using the uplink transmit power (e.g., as described in connection with 622).

The apparatus may include additional components that perform each of the blocks of the algorithm in the aforementioned flowcharts of FIGS. 6 and/or 7. As such, each block in the aforementioned flowcharts of FIGS. 6 and/or 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
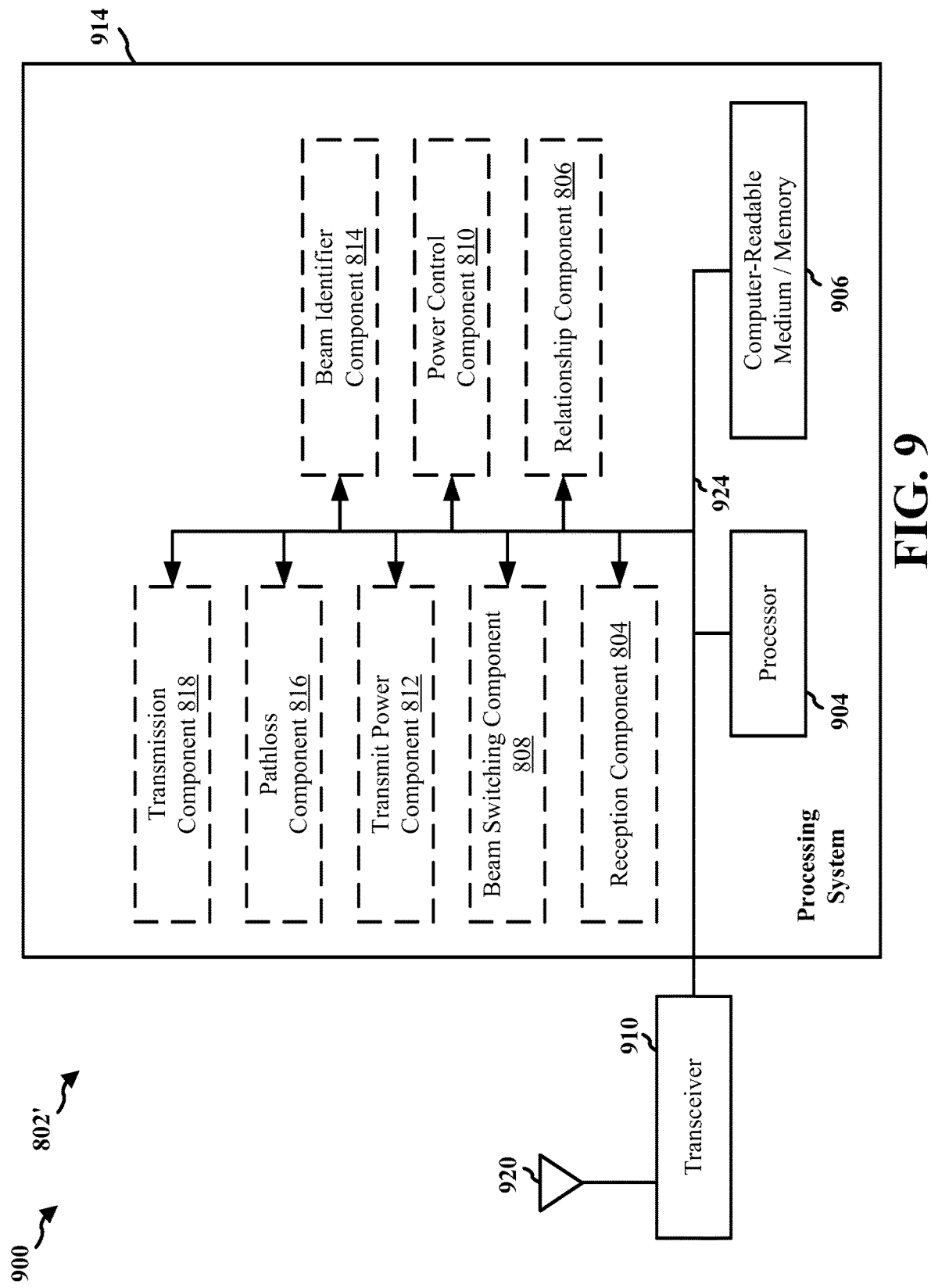
FIG. 9 is a diagram illustrating an example of a hardware implementation for an apparatus employing a processing system, in accordance with the teachings disclosed herein.

FIG. 9 is a diagram 900 illustrating an example of a hardware implementation for an apparatus 802' employing a processing system 914. The processing system 914 may be implemented with a bus architecture, represented generally by bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, 816, 818, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 818, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, 816, 818. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternatively, the processing system 914 may be the entire UE (e.g., see the UE 350 of FIG. 3).

In one configuration, the apparatus 802/802' for wireless communication includes means for receiving a pathloss and spatial relation information linking indicator. The apparatus 802/802' may also include means for determining a pathloss reference signal based on a transmit beam. The apparatus 802/802' may also include means for measuring pathloss for the transmit beam based on the determined pathloss reference signal. The apparatus 802/802' may also include means for determining an uplink transmit power for the transmit beam based on the pathloss measured by the UE. The apparatus 802/802' may also include means for transmitting an uplink transmission using the uplink transmit power determined based on the pathloss measured by the UE. The apparatus 802/802' may also include means for determining the pathloss reference signal based on the transmit beam when the pathloss reference signal is not configured by a base station. The apparatus 802/802' may also include means for identifying the pathloss reference signal based on the spatial relation information signal with a lowest identifier when an uplink transmission includes or is based on a set of SRS resources and each of the resources is associated with a respective beam direction or a spatial relation information signal. The apparatus 802/802' may also include means for identifying the pathloss reference signal based on the spatial relation information signal associated with a lowest SRS resource identifier when an uplink transmission includes or is based on a set of SRS resources and each of the resources is associated with a respective beam and a beam identifier. The apparatus 802/802' may also include means for applying at least one of a default set of open loop parameters or a set of parameters with a default index in determining an uplink transmit power for the transmit beam when open-loop power control parameters have not been configured by a base station for the transmit beam. The apparatus 802/802' may also include means for determining a pathloss reference signal for a transmit beam. The apparatus 802/802' may also include means for measuring pathloss for the transmit beam based on the determined pathloss reference signal. The apparatus 802/802' may also include means for maintaining layer-3 filtering of measured pathloss for the transmit beam after the pathloss reference signal is used to measure the pathloss. The apparatus 802/802' may also include means for stopping maintaining of the layer-3 filtering of the measured pathloss after a threshold period following use of the pathloss reference signal to measure the pathloss occurs. The apparatus 802/802' may also include means for determining a second pathloss reference signal for measuring pathloss for the transmit beam based on at least one of receiving signaling of the second pathloss reference signal via an RRC configuration, receiving signaling of the second pathloss reference signal via a MAC-CE, or activating the second pathloss reference signal based on the transmit beam.

The aforementioned means may be one or more of the aforementioned components of the apparatus 802 and/or the processing system 914 of the apparatus 802' configured to perform the functions recited by the aforementioned means. As described supra, the processing system 914 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 10:
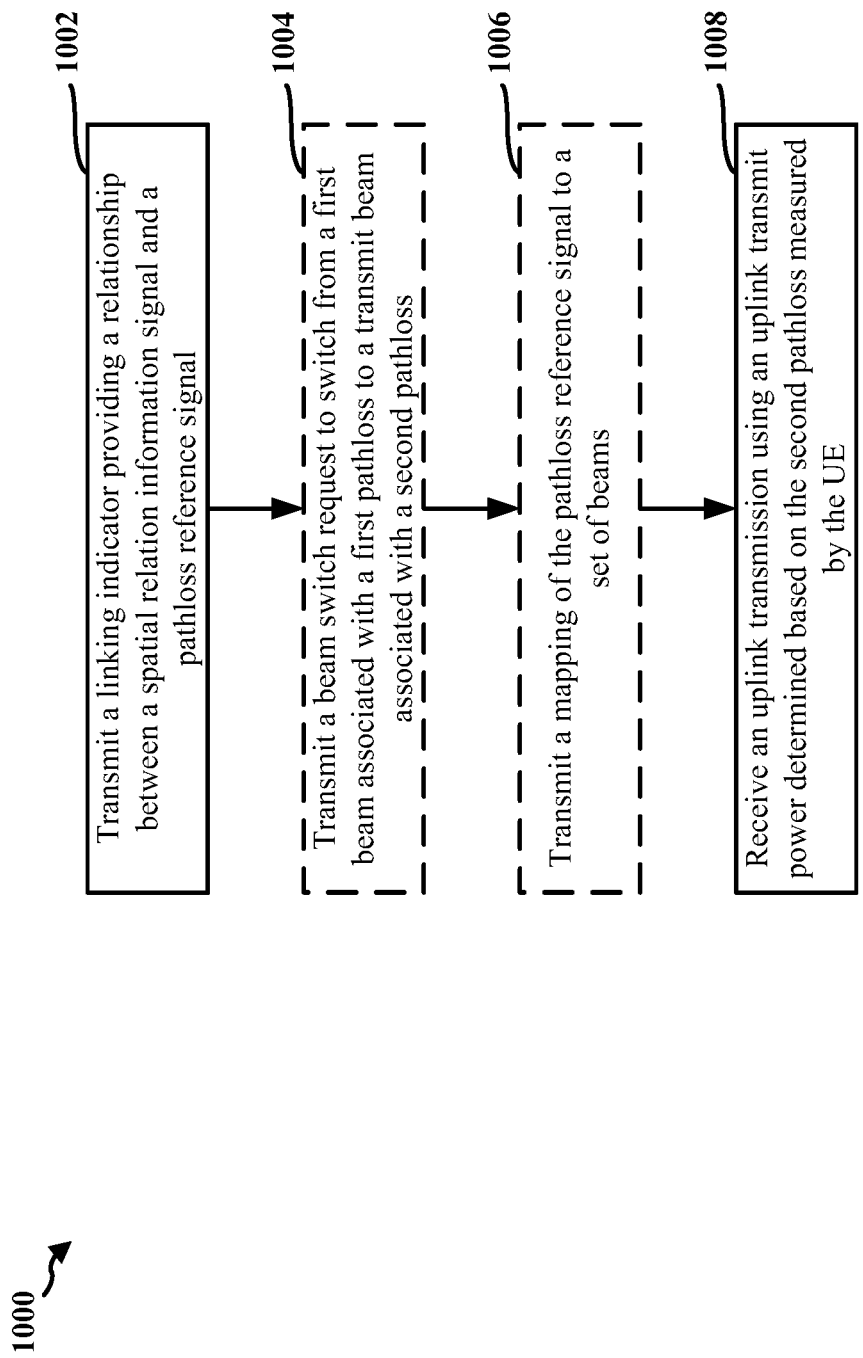
FIG. 10 is a flowchart of a method of wireless communication at a base station, in accordance with the teachings disclosed herein.

FIG. 10 is a flowchart 1000 of a method of wireless communication. The method may be performed by a base station (e.g., the base station 102/180, the base station 310, the base station 402 of FIG. 4A, the base station 502; the apparatus 1102/1102'; the processing system 1214, which may include the memory 376 and which may be the entire base station 310 or a component of the base station 310, such as the TX processor 316, the RX processor 370, and/or the controller/processor 375). Optional aspects are illustrated with a dashed line. The example flowchart 1000 of FIG. 10 facilitates a base station enabling fast UL beam switching, and resulting in improved cell coverage by reducing periods of uncertainty due to less than optimal uplink transmit powers.

At 1002, the base station transmits a linking indicator providing a relation between a spatial relation information signal and a pathloss reference signal, as described in connection with, for example, the linking indicator 512 of FIG. 5. For example, an indication component 1106 of apparatus 1102 may facilitate the transmitting of a pathloss and spatial relation information linking indicator providing the indication of the relation between the spatial relation information signal and the pathloss reference signal. In some examples, the base station may transmit the indication to a UE. In some examples, the base station may transmit the indication via RRC signaling. For example, the indication may include an RRC configuration indicating the relationship between the spatial relation information signal and the pathloss reference signal. In some examples, the indication may include an activation and/or an updating of the relationship between the spatial relation relationship information and the pathloss reference signal. In some such examples, the base station may transmit the activation in a MAC-CE.

At 1004, the base station may transmit a beam switch request to switch from a first beam associated with a first pathloss to a transmit beam associated with a second pathloss, as described in connection with, for example, the beam switch request 514 of FIG. 5. For example, a beam switch component 1108 of the apparatus 1102 may facilitate the transmitting of the beam switch request to the UE. In some examples, the base station may transmit the beam switch request for at least one of SRS, an uplink shared channel, or an uplink control channel. In some examples, the beam switch request may include a set of SRS resources (and/or may be based on a set of SRS resources) and each of the resources may be associated with a respective beam direction and a spatial relation information signal. In some examples, the beam switch request may include a set of SRS resources (and/or may be based on a set of SRS resources) and each of the resources may be associated with a respective beam and a beam identifier.

At 1006, the base station may transmit a mapping of the pathloss reference signal to a set of beams (or spatial relation information signals). For example, a mapping component 1110 of the apparatus 1102 may facilitate the transmitting of the mapping of the pathloss reference signal to the set of beams. In some examples, the base station may indicate the mapping in a MAC-CE. In some examples, the set of beams may include one beam.

At 1008, the base station receives, from the UE, an uplink transmission using an uplink transmit power determined based on the second pathloss measured by the UE, as described in connection with, for example, the second uplink transmission 522 of FIG. 5. For example, a reception component 1104 of the apparatus 1102 may facilitate the receiving of the uplink transmission using the uplink transmit power.

Figure 11:
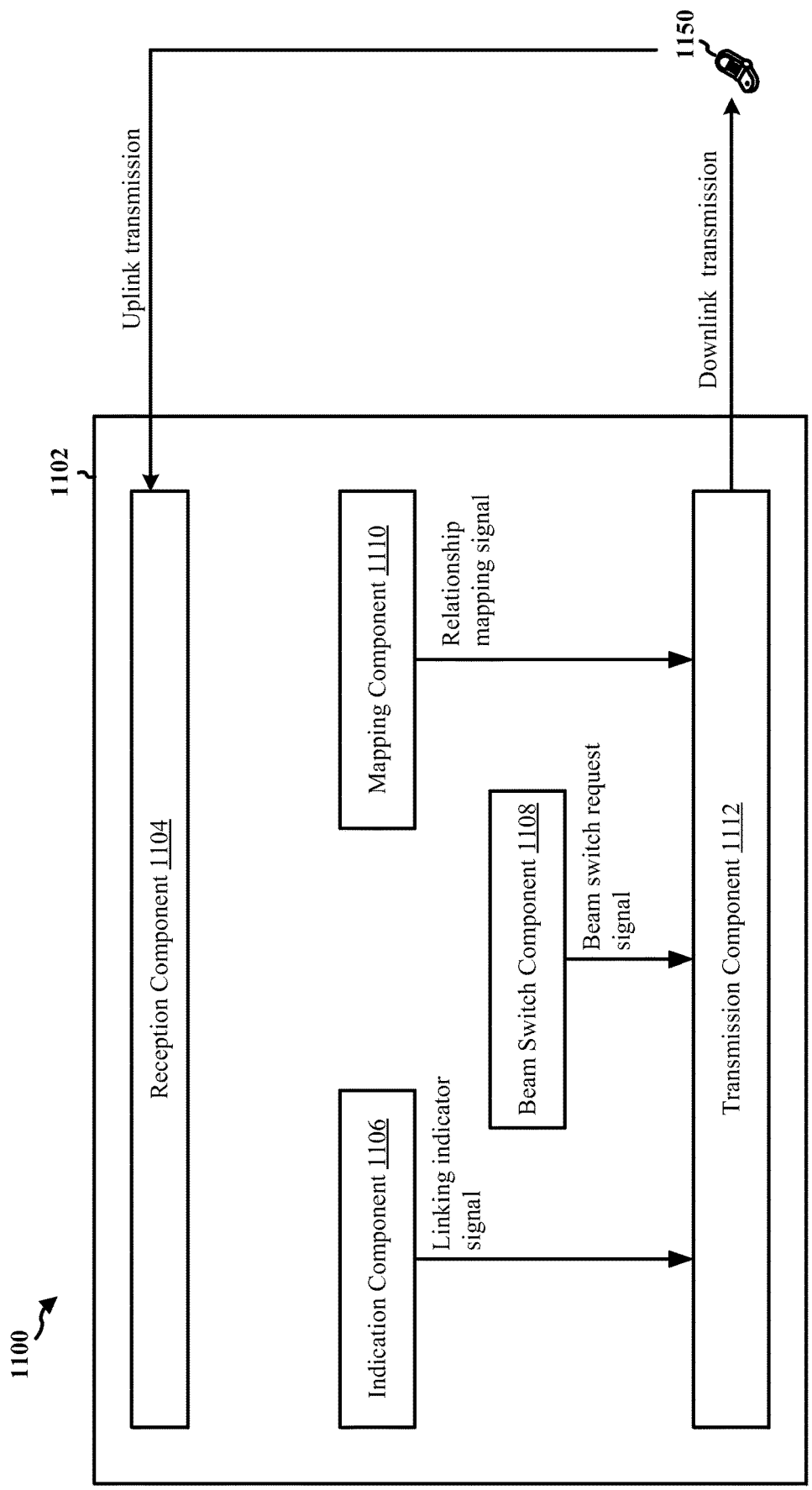
FIG. 11 is a conceptual data flow diagram illustrating the data flow between different means/components in an example apparatus, in accordance with the teachings disclosed herein.

FIG. 11 is a conceptual data flow diagram 1100 illustrating the data flow between different means/components in an example apparatus 1102 in communication with a UE 1150. The apparatus 1102 may be a base station or a component of a base station. The apparatus 1102 may perform the method of flowchart 1000. The apparatus 1102 includes a reception component 1104, an indication component 1106, a beam switch component 1108, a mapping component 1110, and a transmission component 1112. The UE 1150 may include the same or similar component as shown with respect to the UE 104 of FIG. 1, the UE 350 of FIG. 3, the UE 404 of FIG. 4A, the UE 504 of FIG. 5, and/or the apparatus 802/802' of FIGS. 8/9.

The reception component 1104 may be configured to receive various types of signals/messages and/or other information from other devices, including, for example, the UE 1150. The messages/information may be received via the reception component 1104 and provided to one or more components of the apparatus 1102 for further processing and/or use in performing various operations. For example, the reception component 1104 may be configured to receive an uplink transmission on a second beam at an uplink transmit power (e.g., as described in connection with 1008).

The indication component 1106 may be configured to facilitate transmitting a linking indicator providing a relationship between a spatial relation information signal and a pathloss reference signal (e.g., as described in connection with 1002).

The beam switch component 1108 may be configured to facilitate transmitting a beam switch request to switch from a first beam associated with a first pathloss to a transmit beam associated with a second pathloss (e.g., as described in connection with 1004).

The mapping component 1110 may be configured to facilitate transmitting a mapping of the pathloss reference signal to a set of beams (e.g., as described in connection with 1006).

The transmission component 1112 may be configured to transmit various types of signals/messages and/or other information to other devices, including, for example, the UE 1150. For example, the transmission component 1112 may be configured to transmit an indication of a relationship between a spatial relation and a pathloss reference signal, transmit a beam switch request, and/or transmit a mapping of a pathloss reference signal to a set of beams (e.g., as described in connection with 1002, 1004, and/or 1006).

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
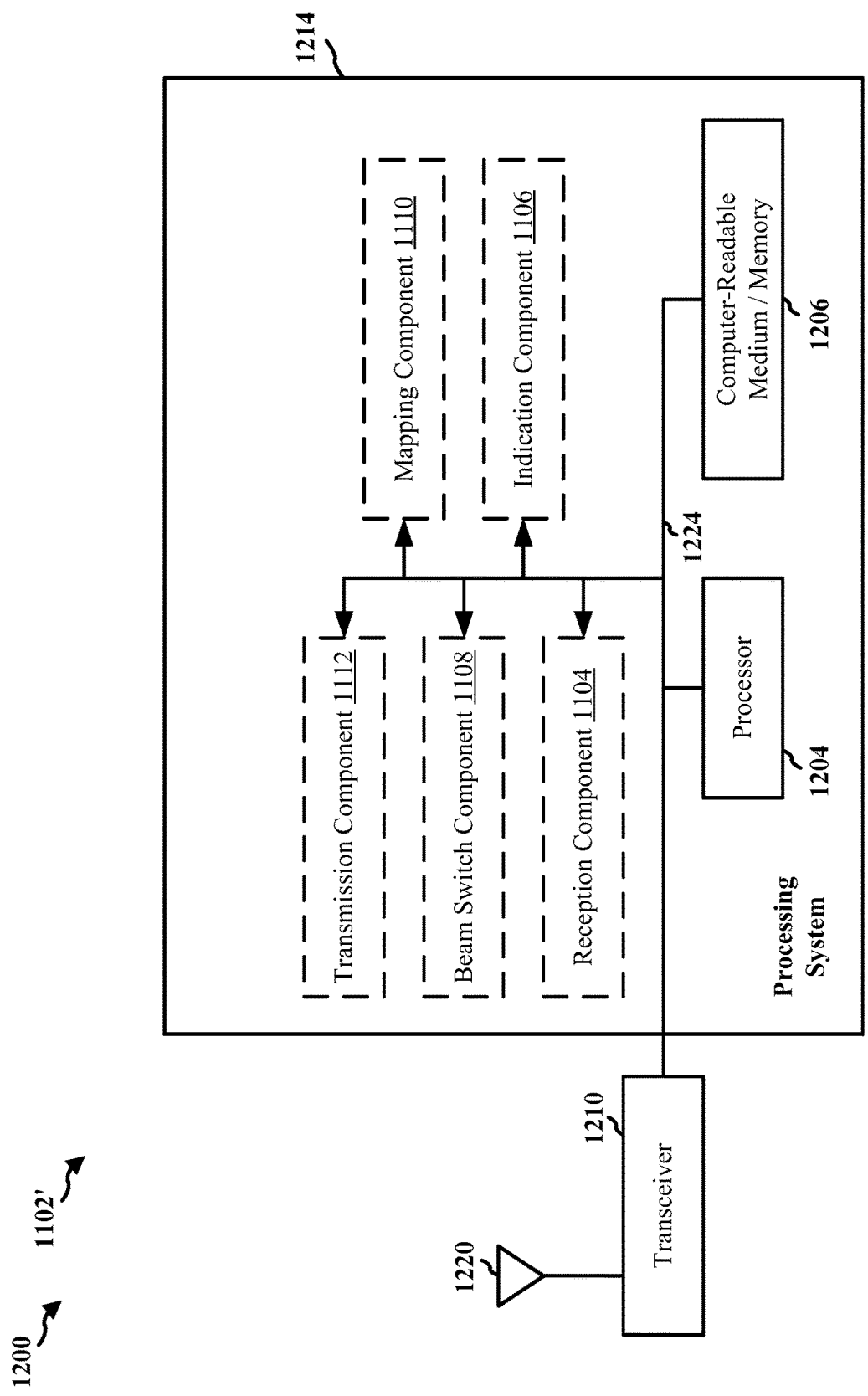
FIG. 12 is a diagram illustrating an example of a hardware implementation for an apparatus employing a processing system, in accordance with the teachings disclosed herein.

FIG. 12 is a diagram 1200 illustrating an example of a hardware implementation for an apparatus 1102' employing a processing system 1214. The processing system 1214 may be implemented with a bus architecture, represented generally by bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. Alternatively, the processing system 1214 may be the entire base station (e.g., see the base station 310 of FIG. 3).

In one configuration, the apparatus 1102/1102' for wireless communication includes means for transmitting, to a UE, a linking indicator providing a relationship between a spatial relation information signal and a pathloss reference signal. The apparatus 1102/1102' also includes means for receiving, from the UE, an uplink transmission using an uplink transmit power determined based on the a pathloss measured by the UE. The apparatus 1102/1102' also includes means for transmitting a beam switch request to switch from a first beam associated with a first pathloss to a transmit beam associated with the measured pathloss. The apparatus 1102/1102' also includes means for transmitting, to the UE, a mapping of the pathloss reference signal to a set of beams.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other examples or teachings described herein, without limitation.

Example 1 is a method of wireless communication at a UE, comprising: receiving a pathloss and spatial relation information linking indicator; determining a pathloss reference signal based on a transmit beam; and measuring pathloss for the transmit beam based on the determined pathloss reference signal.

In Example 2, the method of Example 1 further includes determining an uplink transmit power for the transmit beam based on the pathloss measured by the UE; and transmitting an uplink transmission using the uplink transmit power determined based on the pathloss measured by the UE.

In Example 3, the method of any of Example 1 or Example 2 further includes that the pathloss and spatial relation information linking indicator provides an indication, from a base station, of a relationship between one or more spatial relation information signals and one or more pathloss reference signals.

In Example 4, the method of any of Example 1 to Example 3 further includes that the indication comprises an RRC configuration indicating the relationship between the spatial relation information signal and the pathloss reference signal.

In Example 5, the method of any of Example 1 to Example 4 further includes that the indication comprises an activation and updating of the relationship between the spatial relation information signal and the pathloss reference signal, the activation and updating being received in a MAC-CE.

In Example 6, the method of any of Example 1 to Example 5 further includes that the UE determines the pathloss reference signal based on the transmit beam when the pathloss reference signal is not configured by a base station.

In Example 7, the method of any of Example 1 to Example 6 further includes that the pathloss and spatial relation information linking indicator is received for at least one of an SRS, an uplink shared channel, or an uplink control channel.

In Example 8, the method of any of Example 1 to Example 7 further includes that for an uplink transmission includes or is based on a set of SRS resources and each of the resources is associated with a respective beam direction or a spatial relation information signal, the method further comprising: identifying the pathloss reference signal based on the spatial relation information signal with a lowest identifier.

In Example 9, the method of any of Example 1 to Example 8 further includes that for an uplink transmission includes or is based on a set of SRS resources and each of the resources is associated with a respective beam and a beam identifier, the method further comprising: identifying the pathloss reference signal based on the spatial relation information signal associated with a lowest SRS resource identifier.

In Example 10, the method of any of Example 1 to Example 9 further includes that the pathloss reference signal maps to a set of beams.

In Example 11, the method of any of Example 1 to Example 10 further includes that the set of beams includes one beam.

In Example 12, the method of any of Example 1 to Example 11 further includes that the mapping of the pathloss reference signal to the set of beams is received from a base station.

In Example 13, the method of any of Example 1 to Example 12 further includes that the mapping is configured in a MAC-CE.

In Example 14, the method of any of Example 1 to Example 13 further includes that the UE applies at least one of a default set of open loop parameters or a set of parameters with a default index in determining an uplink transmit power for the transmit beam when open-loop power control parameters have not been configured by a base station for the transmit beam.

In Example 15, the method of any of Example 1 to Example 14 further includes that the UE maintains layer-3 filtering of measured pathloss for the transmit beam after the pathloss reference signal is used to measure the pathloss.

In Example 16, the method of any of Example 1 to Example 15 further includes that the UE stops maintaining the layer-3 filtering of the measured pathloss after a threshold period following use of the pathloss reference signal to measure the pathloss.

Example 17 is a device including one or more processors and one or more memories in electronic communication with the one or more processors storing instructions executable by the one or more processors to cause a system or an apparatus to implement a method as in any of Examples 1 to 16.

Example 18 is a system or apparatus including means for implementing a method or realizing an apparatus as in any of Examples 1 to 16.

Example 19 is a non-transitory computer-readable medium storing instructions executable by one or more processors to cause the one or more processors to implement a method as in any of Examples 1 to 16.

Example 20 is a method of wireless communication at a UE, comprising: determining a pathloss reference signal for a transmit beam; measuring pathloss for the transmit beam based on the determined pathloss reference signal; and maintaining layer-3 filtering of measured pathloss for the transmit beam after the pathloss reference signal is used to measure the pathloss.

In Example 21, the method of Example 20 further includes the UE stops maintaining the layer-3 filtering of the measured pathloss after a threshold period following use of the pathloss reference signal to measure the pathloss occurs.

In Example 22, the method of any of Example 20 or Example 21 further includes that the UE determines a second pathloss reference signal for measuring pathloss for the transmit beam based on at least one of receiving signaling of the second pathloss reference signal via an RRC configuration, receiving signaling of the second pathloss reference signal via a MAC-CE, or activating the second pathloss reference signal based on the transmit beam.

Example 23 is a device including one or more processors and one or more memories in electronic communication with the one or more processors storing instructions executable by the one or more processors to cause a system or an apparatus to implement a method as in any of Examples 20 to 22.

Example 24 is a system or apparatus including means for implementing a method or realizing an apparatus as in any of Examples 20 to 22.

Example 25 is a non-transitory computer-readable medium storing instructions executable by one or more processors to cause the one or more processors to implement a method as in any of Examples 20 to 22.

Example 26 is a method of wireless communication at a base station, comprising: transmitting, to a UE, a linking indicator providing a relationship between a spatial relation information signal and a pathloss reference signal; and receiving, from the UE, an uplink transmission using an uplink transmit power determined based on the a pathloss measured by the UE.

In Example 27, the method of Example 26 further includes that the linking indicator comprises an RRC configuration indicating the relationship between the spatial relation information signal and the pathloss reference signal.

In Example 28, the method of Example 26 or Example 27 further includes that the linking indicator comprises an activation or updating of the relationship between the spatial relation information signal and the pathloss reference signal, the activation or updating being transmit in a MAC-CE.

In Example 29, the method of any of Example 26 to Example 28 further includes transmitting a beam switch request to switch from a first beam associated with a first pathloss to a transmit beam associated with the measured pathloss.

In Example 30, the method of any of Example 26 to Example 29 further includes that the beam switch request is transmitted for at least one of an SRS, an uplink shared channel, or an uplink control channel.

In Example 31, the method of any of Example 26 to Example 30 further includes that the beam switch request includes a set of resources and each of the resources is associated with a respective beam and a beam identifier.

In Example 32, the method of any of Example 26 to Example 31 further includes that the beam switch request is associated with a physical uplink shared channel associated with two or more beams.

In Example 33, the method of any of Example 26 to Example 32 further includes transmitting, to the UE, a mapping of the pathloss reference signal to a set of beams.

In Example 34, the method of any of Example 26 to Example 33 further includes that the mapping is configured in a MAC-CE.

In Example 35, the method of any of Example 26 to Example 34 further includes that the set of beams includes one beam.

Example 36 is a device including one or more processors and one or more memories in electronic communication with the one or more processors storing instructions executable by the one or more processors to cause a system or an apparatus to implement a method as in any of Examples 26 to 35.

Example 37 is a system or apparatus including means for implementing a method or realizing an apparatus as in any of Examples 26 to 35.

Example 38 is a non-transitory computer-readable medium storing instructions executable by one or more processors to cause the one or more processors to implement a method as in any of Examples 26 to 35.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving a first power control parameter identifying a first pathloss reference signal associated with a first beam;
   receiving a pathloss and spatial relation information linking indicator providing a relationship between a first set of spatial relation information signals and a second set of pathloss reference signals;
   determining a second pathloss reference signal for a transmit beam based on the pathloss and spatial relation information linking indicator and without receiving a second power control parameter identifying the second pathloss reference signal for the transmit beam, the transmit beam being different from the first beam; and
   measuring pathloss for the transmit beam based on the second pathloss reference signal.

2. The method of claim 1, further comprising:
   determining an uplink transmit power for the transmit beam based on the pathloss measured by the UE; and
   transmitting an uplink transmission using the uplink transmit power determined based on the pathloss measured by the UE.

3. The method of claim 1, wherein the pathloss and spatial relation information linking indicator provides an indication, from a network, of the relationship between the first set of spatial relation information signals and the second set of pathloss reference signals.

4. The method of claim 3, wherein the indication comprises a radio resource control (RRC) configuration indicating the relationship between the first set of spatial relation information signals and the second set of pathloss reference signals.

5. The method of claim 3, wherein the indication comprises an activation and updating of the relationship between the first set of spatial relation information signals and the second set of pathloss reference signals, the activation and updating being received in a medium access control—control element (MAC-CE).

6. The method of claim 1, wherein the second pathloss reference signal is not configured for at least one of a sounding reference signal (SRS), an uplink shared channel, or an uplink control.

7. The method of claim 1, wherein the pathloss and spatial relation information linking indicator is received for at least one of a sounding reference signal (SRS), an uplink shared channel, or an uplink control channel.

8. The method of claim 1, wherein an uplink transmission includes or is based on a set of sounding reference signal (SRS) resources and each resource of the set of SRS resources is associated with a respective beam direction or a respective spatial relation information signal, the method further comprising:
identifying the second pathloss reference signal based on a spatial relation information signal with a lowest identifier.

9. The method of claim 1, wherein an uplink transmission includes or is based on a set of sounding reference signal (SRS) resources and each resource of the set of SRS resources is associated with a respective beam and a beam identifier, the method further comprising:
identifying the second pathloss reference signal based on a spatial relation information signal associated with a lowest SRS resource identifier.

10. The method of claim 1, wherein the second pathloss reference signal maps to a set of beams.

11. The method of claim 10, wherein the set of beams includes one beam.

12. The method of claim 10, wherein mapping of the second pathloss reference signal to the set of beams is received from a base station.

13. The method of claim 12, wherein the mapping is configured in a medium access control—control element (MAC-CE).

14. The method of claim 1, further comprising:
applying at least one of a default set of open-loop parameters or a set of parameters with a default index to determine an uplink transmit power for the transmit beam based on open-loop power control parameters not having been configured for the transmit beam.

15. A method of wireless communication at a user equipment (UE), comprising:
determining a pathloss reference signal for a transmit beam;
measuring pathloss for the transmit beam based on the pathloss reference signal;
performing layer-3 filtering of measured pathloss for the transmit beam after the pathloss reference signal is used to measure the pathloss; and
stopping performing the layer-3 filtering of the measured pathloss after a threshold period following use of the pathloss reference signal to measure the pathloss occurs.

16. The method of claim 15, wherein the UE determines a second pathloss reference signal for measuring the pathloss for the transmit beam based on at least one of:
receiving first signaling of the second pathloss reference signal via a radio resource control (RRC) configuration,
receiving second signaling of the second pathloss reference signal via a medium access control—control element (MAC-CE), or
activating the second pathloss reference signal based on the transmit beam.

17. A method of wireless communication at a base station, comprising:
transmitting, to a user equipment (UE), a first power control parameter identifying a first pathloss reference signal associated with a first beam;
transmitting a linking indicator providing a relationship between a first set of spatial relation information signals and a second set of pathloss reference signals; and
receiving an uplink transmission using an uplink transmit power determined based on a pathloss measured by the UE and the linking indicator, the pathloss being measured for a transmit beam based on a second pathloss reference signal, the transmit beam being different from the first beam, and the second pathloss reference signal identified without transmitting a second power control parameter identifying the second pathloss reference signal for the transmit beam.

18. The method of claim 17, wherein the linking indicator comprises a radio resource control (RRC) configuration indicating the relationship between the first set of spatial relation information signals and the second set of pathloss reference signals.

19. The method of claim 17, wherein the linking indicator comprises an activation or updating of the relationship between the first set of spatial relation information signals and the second set of pathloss reference signals, the activation or the updating being transmit in a medium access control—control element (MAC-CE).

20. The method of claim 17, further comprising:
transmitting a beam switch request to switch from the first beam associated with a first pathloss to the transmit beam associated with the pathloss measured by the UE.

21. The method of claim 20, wherein the beam switch request is transmitted for at least one of a sounding reference signal (SRS), an uplink shared channel, or an uplink control channel.

22. The method of claim 20, wherein the beam switch request includes a set of resources and each resource of the set of resources is associated with a respective beam and a beam identifier.

23. The method of claim 20, wherein the beam switch request is associated with a physical uplink shared channel associated with two or more beams.

24. The method of claim 17, further comprising:
transmitting, to the UE, a mapping of the second pathloss reference signal to a set of beams.

25. The method of claim 24, wherein the mapping is indicated in a medium access control—control element (MAC-CE).

26. The method of claim 24, wherein the set of beams includes one beam.

27. An apparatus for wireless communication at a base station, comprising:
means for transmitting, to a user equipment (UE), a first power control parameter identifying a first pathloss reference signal associated with a first beam;
means for transmitting a linking indicator providing a relationship between a first set of spatial relation information signals and a second set of pathloss reference signals; and
means for receiving an uplink transmission using an uplink transmit power determined based on a pathloss measured by the UE and the linking indicator, the pathloss being measured for a transmit beam based on a second pathloss reference signal, the transmit beam being different from the first beam, and the second pathloss reference signal identified without transmitting a second power control parameter identifying the second pathloss reference signal for the transmit beam.

* * * * *